United States Patent [19]

Pori

[11] Patent Number: 4,807,833

[45] Date of Patent: Feb. 28, 1989

[54] COMBINED SPACE VEHICLE FUEL CELL AND SPACE STATION STRUCTURAL BUILDING COMPONENT

[76] Inventor: James A. Pori, 670 E. Third St., San Mateo, Calif. 94401

[21] Appl. No.: 850,804

[22] Filed: Apr. 11, 1986

[51] Int. Cl.$^4$ .............................................. B64G 1/14
[52] U.S. Cl. ............................ 244/158 R; 244/159; 244/160; 244/135 R; 244/172; 220/426
[58] Field of Search ................... 244/158 R, 159, 160, 244/161, 162, 163, 172, 2, 135 R; 220/426; 102/381

[56] References Cited

U.S. PATENT DOCUMENTS

| | | | |
|---|---|---|---|
| 2,902,822 | 9/1959 | McKiernan | 220/426 |
| 3,157,147 | 11/1964 | Ludwig | 220/426 |
| 3,202,381 | 8/1965 | Wuenscher | 244/160 |
| 3,242,811 | 3/1966 | Swet | 102/381 |
| 3,282,459 | 11/1966 | Wilson | 220/426 |
| 3,326,141 | 6/1967 | Graves | 220/426 |
| 3,866,863 | 2/1975 | Pragenau | 244/162 |
| 4,132,373 | 1/1979 | Lang | 244/159 |

OTHER PUBLICATIONS

Stehling, "Small Space Stations Built around Last Stage Tankage", Space/Aeronautics, Sep. 1960, pp. 45–47.
"Space Flight", Flight International, 16 Mar. 1967, pp. 420–421.
Nathan, "A Near Term Space Demonstration Program for Large Structures", Advances in the Astronautical Sciences, vol. 36, part 1, 1978.

Primary Examiner—Galen Barefoot
Attorney, Agent, or Firm—Townsend and Townsend

[57] ABSTRACT

A combined space vehicle fuel cell and modular space station structural building component which provides containment of propellants during launch and thereafter provides one of a plurality of modules which can be interconnected once orbit is achieved for constructing a space station or space platform. The combined space vehicle fuel cell and modular space station structural building component is configured so that a first pressure vessel for containment of one propellant is preferably concentrically positioned within a second pressure vessel for another propellant, which can result in a shorter fuel cell. Intervessel structure is included for interconnecting the pressure vessels but is lightweight due to the concentric configuration of the pressure vessels and is preferably concentrated in the aft end of the fuel cell for providing a rigid structure for receiving thrust through any and all thrust attaches to a spacecraft. The fuel cell configuration results in a lower center of gravity, which enables more vertically oriented thrust to be applied to the space vehicle. Docking structure is incorporated into the combined space vehicle fuel cell and modular space station structural building component for connection with other similar fuel cells after orbit is achieved for constructing a space station or space platform. Preferably, equipment which is not susceptible to damage through contact with the one propellant is pre-installed on the earth to alleviate the need to install such equipment after orbit is achieved, which results in a reduction in the payload requirements for space station construction. The fuel cell can also include a storage compartment for payload.

43 Claims, 3 Drawing Sheets

COMBINED SPACE VEHICLE FUEL CELL AND SPACE STATION STRUCTURAL BUILDING COMPONENT

BACKGROUND OF THE INVENTION

This invention relates to a space vehicle fuel cell, as well a to a planetary orbital space station or space platform. More particularly, the invention relates to recycling a fuel cell(s) launched into orbit as a modular component(s) for a manned space station. Specifically, the invention is directed to a spacecraft fuel cell configured not only for containing propellants during launch but also for providing a modular structural building component once orbit is achieved for construction of a space station.

Initially, space stations were proposed which were to be completely assembled on the earth and then launched into orbit. Typically, these space stations include interconnected sections capable of being collapsed and stored in the payload compartment of a multistage launch vehicle, launched into planetary orbit, and erected in an operative configuration once orbit is achieved.

Various of these proposed space station configurations comprise inflatable structures collapsible to facilitate launching the structure into space and thereafter erectible to form the space station. One recognized disadvantage of the inflatable space station configuration is that installation of equipment is required after erection of the space station in orbit. A problem encountered by the inflatable space station configuration is damage or destruction caused by micro-meteoroid penetration.

Other configurations for a preformed space in Berglund, U.S. Pat. No. 3,169,725, and station appear Nesheim, U.S. Pat. No. 3,332,640, which disclose manned space stations including rigid sections collapsible for orbital deployment and thereafter erectible to an operative configuration. Although these space stations constructed of rigid sections allow pre-installation of equipment on the earth and ameliorate the micrometeoroid damage problem, the size and weight of such rigid body space stations is presently limited by the amount of payload that can be launched at one time into orbit by known launch vehicles. One result is that such rigid body space stations are not sufficiently large to allow gravity simulation at low rotational speeds. Also, gas leakage by way of improperly seated gaskets and seals between the mechanically joined sections cannot be corrected without disengaging all of the sections at one time by recollapsing the entire structure.

Berglund, U.S. Pat. No. 3,169,725, and Nesheim, U.S. Pat. No. 3,332,640, allude to launching a number of small units into orbit and assembling them together to form a space station. These patents, however, mention various problems with regard to such a space station configuration, namely, total fuel requirements for deploying numerous units, rendezvous of the various units launched into orbit, and difficulty with actual assembly of the various units in space.

Nevertheless, Hogan, U.S. Pat. No. 4,057,207, and Johnston et al., U.S. Pat. No. 4,122,991, undaunted by the problems mentioned in Berglund, U.S. Pat. No. 3,169,725, and Nesheim, U.S. Pat. No. 3,332,640, disclose space stations constructed from modules or materials launched into space at different times. Hogan, U.S. Pat. No. 4,057,207, discloses a space station constructed from modules adapted to be transported by a space shuttle to a predetermined earth orbit and there joined by a number of other space vehicle modules and all connected together to form a pressure tight space station equipped to support a crew for an extended period of time and large enough to generate simulated gravity at low rotational speeds. Johnston et al., U.S. Pat. No. 4,122,991, discloses an apparatus, referred to as a space spider, for producing a space structure in space from prepunched ribbon or sheet material transported from the earth to the spider at different times by a space shuttle, for example; and, typically, a preformed core is utilized for starting the spinning of the desired space structure. Johnston et al., U.S. Pat. No. 4,122,991, discloses a conical space structure attached to a single expended external tank of a space vehicle, such as used by a space shuttle. Unfortunately, material for construction of the space stations disclosed in Hogan, U.S. Pat. No. 4,057,207, and Johnston et al., U.S. Pat. No. 4,122,991, is transported as payload, such that substantial amounts of fuel are consumed to transport materials to the site of assembly of the space station, which dramatically escalates the cost of construction.

By way of further background, various configurations have been proposed for fuel cells for spacecraft. The space shuttle, for example, is a space transportation vehicle in which space crews use the spacecraft orbiter again and again in launches from the earth. The space shuttle is comprised of an orbiter having main rocket engines, which carries the crew and payload, a large external tank that contains the propellants for the main engines of the orbiter, and two solid rocket boosters. The orbiter and rocket boosters are reusable, but the external tank is currently discarded after each launch. The external tank breaks apart and burns in the upper atmosphere of the earth, and the surviving pieces plunge into the ocean.

The two solid rocket boosters are attached to the external tank so that the thrust from the rocket boosters is transmitted to a cylindrical intertank structure from two forward attaches. The aft attaches of the rocket boosters are hinged to the rear wall of the external tank so as to provide lateral rigidity only and do not transmit the thrust of the solid rocket motors. The fact that the forward oxygen pressure vessel is the heaviest part of the external tank and is cantilevered from the lighter aft hydrogen pressure vessel requires that the thrust of the solid rocket boosters enters at only the forward attaches to the intertank structure. Consequently, the intertank structure must have a high degree of structural integrity and is therefore heavy, because the intertank structure must distribute booster thrust from only two points.

Also, Salkeld, U.S. Pat. No. 3,955,784, and von Pragenau, U.S. Pat. No. 4,452,412, disclose various configurations for propellant tanks on a spacecraft, such as a space shuttle. Salkeld, U.S. Pat. No. 3,955,784, discloses plural on-board propellant tanks incorporated into the body of the spacecraft so that all propellant tanks are reused during subsequent launches. von Pragenau, U.S. Pat. No. 4,452,412, discloses a more typical space shuttle configuration, including an orbiter releasably mounted to an external tank and further including two rocket boosters detachably connected to the external tank. As in the case of the known space shuttle, von Pragenau, U.S. Pat. No. 4,452,412, discloses that the rocket boosters are reused, but that the external tank is jettisoned and breaks apart and burns upon reentry into the atmosphere of the earth over a remote ocean area.

SUMMARY OF THE INVENTION

The present invention addresses the problems associated with the known spacecraft fuel cell configuration, which is typically in the form of a liquid oxygen vessel in tandem with a liquid hydrogen vessel. The present invention also addresses the problems of construction of a space station. The invention provides a space vehicle fuel cell having a configuration which enables usage as both an improved propellant container during launch and a modular structural building component for a space station once orbit is achieved. This reduces the amount of payload required to construct a space station, which in turn translates to cost savings in total fuel expenditures directly attributable to construction of the space station.

In accordance with the invention, a combined space vehicle fuel cell and modular space station structural building component is provided. The combined space vehicle fuel cell and modular space station structural building component in accordance with the invention is configured so that a first propellant vessel, such as a pressure vessel for containing liquid hydrogen, is preferably disposed concentrically within a second propellant vessel, such as a pressure vessel for containing liquid oxygen. Consequently, an improved propellant container is provided for use during launch of a space vehicle. The improved fuel cell overcomes the disadvantages of typical fuel cells in which a forward oxygen pressure vessel is connected to an aft hydrogen pressure vessel by means of a heavy intertank structure. In the case where the space vehicle is a space shuttle, for example, the fuel cell in accordance with the invention overcomes the disadvantages of the known space shuttle fuel cell where the forward oxygen pressure vessel is the heaviest part of the external tank and is cantilevered from the lighter aft hydrogen pressure vessel, which requires that the thrust of the solid rocket boosters enters at only the forward attaches to the intertank structure, thereby requiring a heavy intertank structure to distribute rocket booster thrust. The fuel cell in accordance with the invention eliminates the heavy intertank structure and enables a reduction in the length of the external tank when the fuel cell is used only for containing propellants. Alternatively, the fuel cell can be maintained the same length with the propellant vessel volumes increased or a portion of the fuel tank converted to payload storage. Also, the configuration of the fuel cell in accordance with the invention allows a shift of the center of gravity of the space shuttle toward the aft end of the spacecraft and enables the thrust attaches for the solid rocket boosters to be at the aft end of the fuel cell, which enables more vertically oriented thrust from the main engines of the orbiter to be applied to the space shuttle due to reduction of the moment about the vertical axis of the space shuttle.

Furthermore, the space vehicle fuel cell in accordance with the invention enables the fuel cell to be used as a modular space station structural building component. The region between the first pressure vessel and the second pressure vessel can be evacuated upon exhaustion of the propellant so as to provide an insulative region around the first pressure vessel similar to a thermos bottle structure. The fuel cells can be connected in tandem and/or side-by-side for the purpose of providing a superstructure for a space station or space platform. The fuel cells are preferably interconnected by docking means or, alternatively, can include integral docking means so that the fuel cell can be connected to other similar fuel cells.

The fuel cell can be constructed in a slightly arcuate form so that a ring configuration is formed upon interconnection of the fuel cell in tandem to other similar fuel cells. Alternatively, the docking means can have a configuration so that the interconnection between adjacent fuel cells is slightly arcuate. The fuel cells interconnected in the form of a ring can be rotated to produce artificial gravity.

In the case where the fuel cell is incorporated into the space shuttle, the diameter of the first pressure vessel is sufficiently large to accommodate equipment preferably pre-installed on the earth and still provides ample room for living quarters and corridors for a manned space station or space laboratory. Preferably, equipment for life support and scientific and industrial uses is pre-installed on the earth before orbital deployment. The use of the space vehicle fuel cell in accordance with the invention as a modular space station structural building component substantially reduces the construction cost of a space station or space platform.

BRIEF DESCRIPTION OF THE DRAWINGS

The above and other features and the concomitant advantages of the present invention will be better understood and appreciated by those skilled in the art in view of the description of the preferred embodiments given below in connection with the accompanying drawings. In the drawings.

DESCRIPTION OF THE PREFERRED EMBODIMENTS

The present invention provides a space vehicle fuel cell or external tank which provides both a storage container for propellants expended during launch of a spacecraft and thereafter serves as a modular structural building component for a space station after being jettisoned from the spacecraft once orbit is achieved and alternatively can be launched as an unmanned spacecraft into orbit for construction of a space station. Although the space vehicle fuel cell in accordance with the invention relates to any type of spacecraft, the space vehicle fuel cell has particular practical appeal for incorporation into a spacecraft in the form of a space shuttle. Accordingly, the detailed description below will focus on various exemplary embodiments adapted for incorporation into the space shuttle with the understanding that the space vehicle fuel cell in accordance with the invention can be incorporated into any type of spacecraft.

Figure 1:
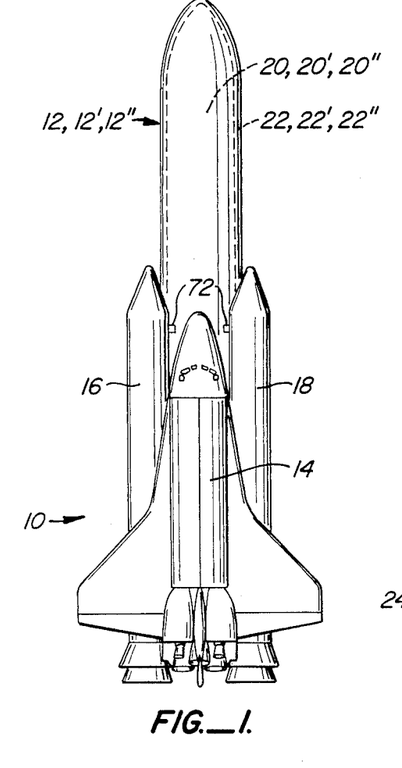
FIG. 1 is an elevational view of a spacecraft which includes a combined space vehicle fuel cell and modular space station structural building component in accordance with the invention.
Figure 2:
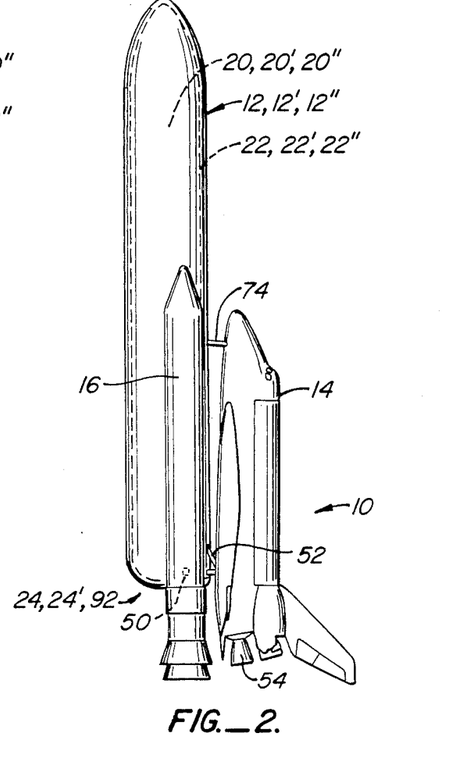
FIG. 2 is a side view of the spacecraft shown in FIG. 1.

With reference to the drawings, FIGS. 1 and 2 show a space shuttle 10 in accordance with the invention, which includes an improved fuel cell or external tank 12. Additionally, the space shuttle 10 includes an orbiter 14 releasably mounted to the external tank 12. Also, two cylindrical solid rocket boosters 16 and 18 are detachably connected to the external tank 12 at angular positions about the periphery of the external tank approximately plus and minus 90°, respectively, from the centerline of securement of the orbiter 14 to the external tank.

The external tank 12 includes first pressure vessel means 20, as well as second pressure vessel means 22 preferably coaxial with the first pressure vessel means and concentrically positioned around the first pressure vessel means. The external tank 12 also includes intervessel structural means 24 for interconnecting the first and second pressure vessel means 20 and 22.

Figure 3:
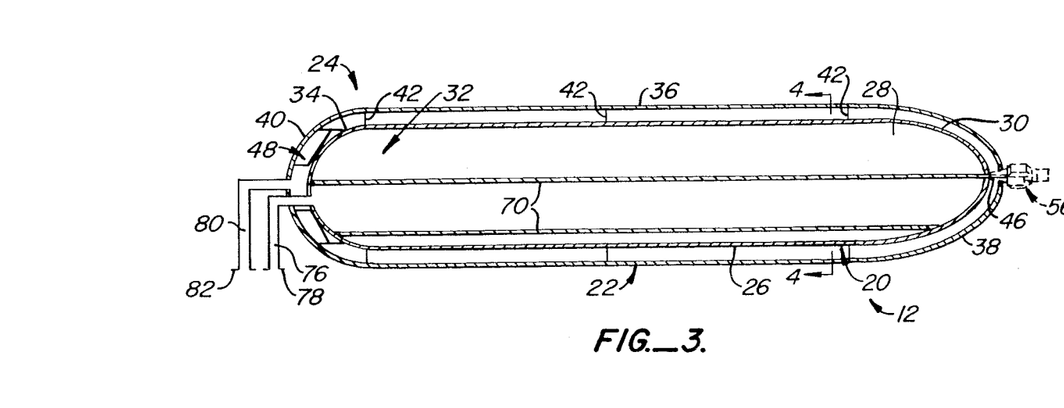
FIG. 3 is a cross-sectional view of one embodiment of a space vehicle fuel cell in accordance with the invention incorporated into the spacecraft configuration shown in FIGS. 1 and 2.

The external tank 12 is preferably configured as shown in more detail in FIG. 3. The first pressure vessel means 20 comprises a first or inner cylindrical wall 26 capped at a forward end 28 by an end dome 30 and capped at an aft end 32 by an end dome 34. The second pressure vessel means 22 preferably comprises a second or outer cylindrical wall 36 capped at the forward end 28 by an end dome 38 and capped at the aft end 32 by an end dome 40, which surround the first pressure vessel means 20.

Liquid hydrogen, on the one hand, is preferably contained within the inner wall 26 and domes 30 and 34 of the first pressure vessel means 20 included in the external tank 12. On the other hand, liquid oxygen is preferably contained in a substantially annular region between the inner wall 26 and domes 30 and 34 of the first pressure vessel means 20 included in the external tank 12, on the one hand, and the outer wall 36 and domes 38 and 40 of the second pressure vessel means 22 included in the external tank, on the other hand.

The external tank for the known space shuttle has a diameter of 27.5 feet (8.4 meters) and a length of 154 feet (47 meters). By way of comparison, the diameter of the inner wall 26 of the external tank 12 can be approximately 23.35 feet (7.13 meters), while the diameter of the outer wall 36 of the external tank can be approximately 27.5 feet (8.4 meters) in the case of a space shuttle which incorporates the external tank 12 in accordance with the invention. Consequently, the length of the external tank 12 in accordance with the invention can be 120 feet (36.6 meters), instead of 154 feet (47 meters).

These dimensions for the external tank 12 are based on the fact that the external tank for the known space shuttle contains 143,000 gallons (541,312 liters) of liquid oxygen and 383,000 gallons (1,449,808 liters) of liquid hydrogen. The dimensions for the external tank 12 given above provide approximately 148,757 gallons (563,105 liters) of liquid oxygen and 384,338 gallons (1,454,873 liters) of liquid hydrogen with a reduction in length of the external tank of 34 feet (10.4 meters) from 154 feet (47 meters) to 120 feet (36.6 meters). This is based on a configuration in which the dome 38 is in the form of a nose cap for minimizing aerodynamic drag.

Figure 4:
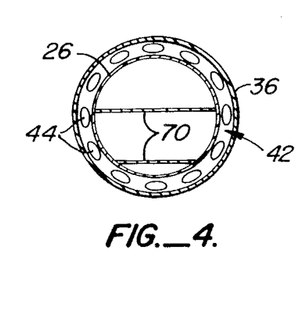
FIG. 4 is a cross-sectional view along line 4—4 shown in FIG. 3.

The intervessel structural means 24 preferably includes at least one arcuate stiffening ring 42 interposed in the annular region between the inner wall 26 and the outer wall 36. As shown in FIG. 4, the stiffening rings 42 preferably have cutouts 44 for allowing liquid oxygen contained within the interstitial region between the inner wall 26 and the outer wall 36 to flow from the forward end 28 of the external tank 12 to the aft end 32 of the external tank. Preferably, the axial alignment of the cutouts 44 in the respective stiffening rings 42 counteracts spiraling of the flow of liquid oxygen as the liquid oxygen is being consumed, thereby avoiding a coriolis effect at the aft end 32 of the external tank 12. Flow vanes (not shown) can also be secured to the inner wall 26 or the outer wall 36, or both, in the interstitial region between the inner wall and the outer wall for producing axial flow of liquid oxygen through the cutouts 44 in order to avoid the coriolis effect.

The intervessel structural means 24 also preferably includes a crown 46 interposed between the dome 30 and the dome 38 in the interstitial region between these domes at the forward end 28 of the external tank 12 for preventing forward movement of the first pressure vessel means 20 within the second pressure vessel means 22 due to the buoyancy of the first pressure vessel means. The crown 46 can be an arcuate plate. The liquid oxygen within the interstitial region between the inner wall 26 and the outer wall 36 aids stabilization of the first pressure vessel means 20 within the second pressure vessel means 22, which reduces the structural requirements for the stiffening rings 42 and the crown 46.

Furthermore, the intervessel structural means 24 preferably includes a thrust frame 48 disposed at the aft end 32 of the external tank 12 in the interstitial region between the dome 34 and the dome 40 for preventing rearward axial displacement of the first pressure vessel means 20 within the second pressure vessel means 22. Referring to FIGS. 1, 2, and 3, the stiffening ring 42 at the aft end 32 of the external tank 12 and the thrust frame 48 provide a rigid structure for connection of thrust attaches 50 for the two solid rocket boosters 16 and 18, as well as thrust attaches 52 for the orbiter 14, to the external tank 12. Consequently, the aft end 32 of the external tank 12 can receive the thrust of the two solid rocket boosters 16 and 18, as well as the thrust of main engines 54 of the orbiter 14.

The external tank 12 is preferably configured so that the heavier oxygen pressure vessel is concentric around the lighter hydrogen pressure vessel, which lowers the center of gravity of the space shuttle 10 compared with the center of gravity of the known space shuttle. This allows the thrust of the two solid rocket boosters 16 and 18 to be routed through the thrust attaches 50 connected to the aft end 32 of the external tank 12. Consequently, the intervessel structural means 24 can be substantially located at the aft end 32 of the external tank 12 where the thrust of the two solid rocket boosters 16 and 18 and the main engines 54 is routed to the external tank, which further reduces the overall weight of the intervessel structure and further lowers the center of gravity.

The conversion of the external tank 12 shown in FIG. 3 from a fuel cell to a modular space station structural building component is preferably provided by removal of the domes 38 and 40 of the second pressure vessel means 22 included in the external tank. Furthermore, passages are then provided in the domes 30 and 34 of the first pressure vessel means 20 included in the external tank 12 for allowing access to the interior of the first pressure vessel means. A cutting torch, saw, or other means can be used for removing the domes 38 and 40 from the outer wall 36 of the second pressure vessel means 22 and for providing passages in the domes 30 and 34 of the first pressure vessel means 20. Alternatively, removable hatches (not shown) can be provided in the domes 30, 34, 38, and 40 for facilitating conversion of the external tank 12 to a modular space station structural building component.

The forward end 28 and the aft end 32 of the external tank 12 are also provided with docking means 56 so that each of the ends can be brought into rigid physical contact with the end(s) of another similar external tank(s) in tandem. Preferably, docking means 56 in the form of docking modules is provided for interconnection of the external tank 12 with other similar external tanks after orbital deployment. The docking module DM-2 used in connection with the Apollo-Soyuz Test Program (ASTP) manufactured by Rockwell International, for example, and described in D. Baker, History of Manned Flight, a New Cavendish Book (1981), pages 512513, and in The Illustrated Encyclopedia of Space Technology, a Salamander Book, Crown Publishers, Inc.: New York (1981), pages 194–195, the disclosures of which are hereby incorporated by reference herein, can be used as a docking module for interconnection of the external tank 12 in tandem with other similar external tanks. Alternatively, the docking means 56 can be incorporated into the forward end 28 and the aft end 32 of the external tank 12, which are exposed for operative interconnection of the external tank in tandem with other similar external tanks during construction of the space station. In view of the existence of the DM-2 docking module and the demonstrated workability of this module during the Apollo-Soyuz Test Program, the use of a docking module is preferred for interconnection of the external tank 12 in tandem with other similar external tanks in orbit. When such a docking means 56 is installed and engaged to another external tank 12, so that the docking means is reasonably fixed to the other external tank at the interface between the external tanks, the docking means provides a pressure tight seal between the two external tanks, thereby forming an airtight bulkhead.

When the forward end 28 of the external tank 12 has been moved into mating engagement with the aft end 32 of another external tank, for example, the docking means 56 associated with the external tank at the forward end 28 automatically engages with related docking means at the aft end 32 of another external tank to lock the external tanks together to form respective joints capable of withstanding tension between the external tanks, as well as internal pressure. The external tanks 12 can then be bolted together to assure that the seal between them will not be inadvertently broken.

As shown in FIG. 3, decks 70 are preferably preinstalled in the first pressure vessel means 20 on the earth, thereby alleviating the need to install these facilities after orbital deployment. Furthermore, various other equipment (not shown), which is not damaged through contact with liquid hydrogen, can also be preinstalled in the first pressure vessel means 20 on the earth prior to orbital deployment.

Figure 6:
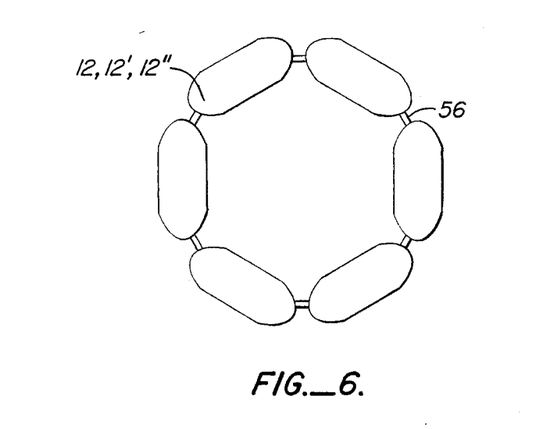
FIG. 6 is a schematic illustration of a plurality of space vehicle fuel cells in accordance with the invention interconnected in tandem to form a space station.

The external tank 12 shown in FIG. 3 is configured for interconnection in tandem or end-to-end relationship with other similar external tanks after orbital deployment. The external tank 12 shown in FIG. 3 can be constructed in a slightly arcuate form. Preferably, the connection of a plurality of external tanks 12 in end-to-end relationship results in a toroidal or ring configuration as shown in FIG. 6. The toroid comprised of the interconnected external tanks 12 can have a diameter considerably more than the 150-feet ideal proposed for some large space stations.

Figure 5:
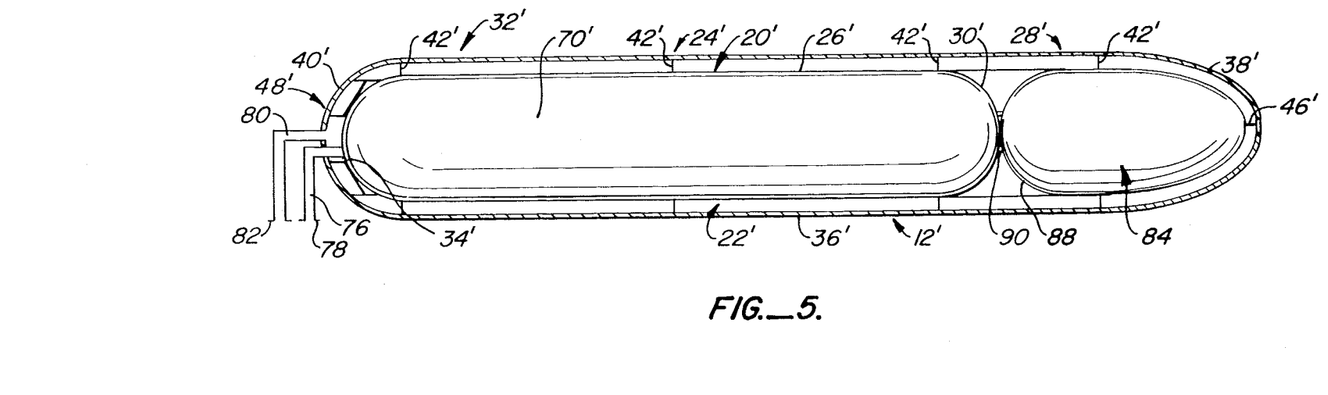
FIG. 5 is a cross-sectional view of an alternative embodiment of a space vehicle fuel cell in accordance with the invention for incorporation into the spacecraft configuration shown in FIGS. 1 and 2.

An alternative embodiment of a space vehicle fuel cell in accordance with the invention is shown in FIG. 5. An external tank 12' includes first pressure vessel means 20' which comprises a first or inner cylindrical wall 26' capped at a forward end 28' by an end dome 30' and capped at an aft end 32' by an end dome 34' A second pressure vessel means 22' is included in the external tank 12' and preferably comprises a second or outer cylindrical wall 36' capped at the forward end 28' by an end dome 38' and capped at the aft end 32' by an end dome 40', which surround the first pressure vessel means 20'. The external tank 12' is also configured to include a payload compartment 84 which comprises a portion of the inner wall 26' capped at the forward end 28' by an end dome 86 and capped at the aft end 32' by an end dome 88.

Liquid hydrogen, on the one hand, is preferably contained within the inner wall 26' and domes 30' and 34' of the first pressure vessel means 20' included in the external tank 12' On the other hand, liquid oxygen is preferably contained in a substantially annular region defined, on the one hand, by the inner wall 26' and domes 34' and 86 and, on the other hand, the outer wall 36' and domes 38' and 40' included in the external tank 12'.

The diameter of the inner wall 26' of the external tank 12' can be approximately 24.5 feet (7.49 meters), while the diameter of the outer wall 36' of the external tank can be approximately 27.5 feet (8.4 meters) in the case of a space shuttle which incorporates the external tank 12' in accordance with the invention. This allows the diameter of the external tank 12' in accordance with the invention to approximately equal the diameter of the external tank of the known space shuttle. Furthermore, the length of the first pressure vessel means 20' from the dome 30' to the dome 34' can be approximately 109 feet (33.3 meters), while the length of the second pressure vessel means 22' from the dome 38' to the dome 40' can be approximately 154 feet (47 meters), which allows the length of the external tank 12' in accordance with the invention to approximately equal the length of the external tank of the known space shuttle. Stated differently, the second pressure vessel means 22' comprises approximately a tank envelope having a 1.5-feet (0.46-meter) internal width. This accommodates a diameter of 24.5 feet (7.99 meters) and a length of 41 feet (12.53 meters) for the payload compartment 84.

These dimensions for the external tank 12' are based on the fact that the external tank for the known space shuttle contains 143,000 gallons (541,312 liters) of liquid oxygen and 383,000 gallons (1,449,808 liters) of liquid hydrogen. The dimensions for the external tank 12' given above provide approximately 144,574 gallons (547,270 liters) of liquid oxygen and 384,147 gallons (1,454,150 liters) of liquid hydrogen with external dimensions approximately equivalent to the external dimensions of the external tank for the known space shuttle. This is based on a configuration in which the dome 38' is in the form of a nose cap for minimizing aerodynamic drag.

Intervessel structural means 24' preferably includes at least one arcuate stiffening ring 42' interposed in the annular region between the inner wall 26' and the outer wall 36'. The stiffening rings 42' preferably have the same configuration as the stiffening rings 42 described earlier in connection with FIG. 4 and are installed to counteract spiraling of the flow of liquid oxygen as the liquid oxygen is being consumed, thereby avoiding a coriolis effect at the aft end 32' of the external tank 12'. Flow vanes (not shown) can also be secured to the inner wall 26' or the outer wall 36', or both, in the interstitial region between the inner wall and the outer wall for producing axial flow of liquid oxygen in order to avoid the coriolis effect.

The intervessel structural means 24' also preferably includes a crown 46' interposed between the dome 38' and the dome 86 in the interstitial region between these domes at the forward end 28' of the external tank 12' for preventing forward movement of the first pressure vessel means 20' and the payload compartment 84 within the second pressure vessel means 22' due to the buoyancy of the first pressure vessel means and payload compartment. The crown 46' can be an arcuate plate. Also, the intervessel structural means 24' preferably includes an intertank frame 90 interposed between the dome 30' of the first pressure vessel means 20' and the dome 88 of the payload compartment 84 for strengthening the external tank 12' along the length of the external tank. The liquid oxygen within the interstitial region between the inner wall 26' and the outer wall 36' aids stabilization of the first pressure vessel means 20' and the payload compartment 84 within the second pressure vessel means 22', which reduces the structural requirements for the stiffening rings 42', the crown 46', and the intertank frame 90.

Furthermore, the intervessel structural means 24' preferably includes a thrust frame 48' disposed at the aft end 32' of the external tank 12' in the interstitial region between the dome 34' and the dome 40' for preventing rearward axial displacement of the first pressure vessel means 20' and the payload compartment 84 within the second pressure vessel means 22'. Referring to FIGS. 1, 2, and 5, the stiffening ring 42' at the aft end 32' of the external tank 12' and the thrust frame 48' provide a rigid structure for connection of the thrust attaches 50 for the two solid rocket boosters 16 and 18, as well as the thrust attaches 52 for the orbiter 14, to the external tank 12'. Consequently, the aft end 32' of the external tank 12' can receive the thrust of the two solid rocket boosters 16 and 18, as well as the thrust of the main engines 54 of the orbiter 14.

The conversion of the external tank 12' from a fuel cell to a modular space station structural building component is preferably provided by removal of the domes 38' and 40' of the second pressure vessel means 22' included in the external tank. Furthermore, passages are then provided in the domes 30' and 34' of the first pressure vessel means 20' and in the domes 86 and 88 of the payload compartment 84 included in the external tank 12' for allowing access to the interior of the first pressure vessel means and payload compartment. Advantageously, the intertank frame 90 included in the intervessel structural means 24' can be configured to serve as a bulkhead at such time as passages are provided in the dome 30' of the first pressure vessel means 20' and the dome 88 of the payload compartment 84.

Preferably, docking means 56 in the form of docking modules is provided for interconnection of the external tank 12' in tandem with other similar external tanks after orbital deployment. The docking module DM-2 used in connection with the Apollo-Soyuz Test Program (ASTP) described above, for example, can be used as a docking module for interconnection of the external tank 12' in tandem with other similar external tanks. Alternatively, the docking means 56 can be incorporated into the forward end 28' and the aft end 32' of the external tank 12', which are exposed for operative interconnection of the external tank with other external tanks during construction of the space station. In view of the existence of the DM-2 docking module and the demonstrated workability of this module during the Apollo-Soyuz Test Program, the use of a docking module is preferred for interconnection of the external tank 12' in tandem to other similar external tanks in orbit.

The docking means 56 operates in the same manner described earlier in conjunction with interconnection of the external tank 12 shown in FIG. 3 in tandem to other similar external tanks. The external tank 12' is configured for interconnection in tandem or end-to-end relationship with other similar external tanks after orbital deployment in the same manner described above in connection with deployment of the external tank 12 shown in FIG. 3.

As shown in FIG. 5, decks 70' are preferably pre-installed in the first pressure vessel means 20' on the earth, thereby alleviating the need to install these facilities after orbital deployment. Furthermore, various other equipment (not shown), which is not damaged through contact with liquid hydrogen, can also be preinstalled in the first pressure vessel means 20' on the earth prior to orbital deployment. Additionally, the payload compartment 84 can serve to transport as payload various equipment needed for deployment of the external tank 12' as a modular space station structural building component. The equipment contained in the payload compartment 84 can include facilities for conversion of the external tank 12' into living quarters, a communication center, or a laboratory, for example. Conveniently, the payload compartment 84 can also be used for orbital deployment of DM-2 docking modules for construction of the space station.

Figure 7:
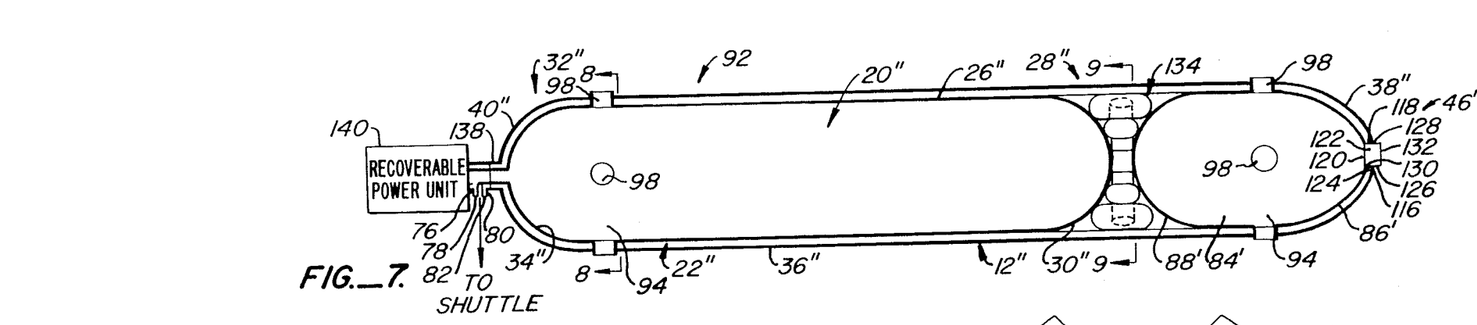
FIG. 7 is a cross-sectional view of another embodiment of a space vehicle fuel cell in accordance with the invention incorporated into the spacecraft configuration shown in FIGS. 1 and 2 and alternatively adapted for being independently launched into orbit.

Another embodiment of a space vehicle fuel cell in accordance with the invention is shown in FIG. 7. An external tank 12" includes first pressure vessel means 20" which comprises a first or inner cylindrical wall 26" capped at a forward end 28" by an end dome 30" and capped at an aft end 32" by an end dome 34". A second pressure vessel means 22" is included in the external tank 12" and preferably comprises a second or outer cylindrical wall 36" capped at the forward end 28" by an end dome 38" and capped at the aft end 32" by an end dome 40", which surround the first pressure vessel means 20". The external tank 12" is also configured to include a payload compartment 84' which comprises a portion of the inner wall 26" capped at the forward end 28" by an end dome 86' and capped at the aft end 32" by an end dome 88'.

Liquid hydrogen, on the one hand, is preferably contained within the inner wall 26" and domes 30" and 34" of the first pressure vessel means 20" included in the external tank 12". On the other hand, liquid hydrogen is preferably contained in a substantially annular region defined, on the one hand, by the inner wall 26" and domes 34" and 86' and, on the other hand, the outer wall 36" and domes 38" and 40" included in the external tank 12".

A comparison of FIGS. 5 and 7 indicates that the configuration of the external tank 12" shown in FIG. 7 is similar to the configuration of the external tank 12' shown in FIG. 5, except for various differences which will be described in detail shortly. The diameters of the inner wall 26" and the outer wall 36" of the external tank 12" can be approximately the same as the diameters of the inner wall 26' and the outer wall 36' of the external tank 12', respectively, in the case of a space shuttle which incorporates the external tank 12" in accordance with the invention. Furthermore, the length of the first pressure vessel means 20" from the dome 30" to the dome 34" and the length of the second pressure vessel means 22" from the dome 38" to the dome 40" of the external tank 12" can be approximately the same as the length of the first pressure vessel means 20' from the dome 30' to the dome 34' and the length of the second pressure vessel means 22' from the dome 38' to the dome 40' of the external tank 12', respectively, for incorporation into the known space shuttle. This accommodates a payload compartment 84' having dimensions approximately the same as the dimensions of the payload compartment 84.

Figures 8, 9, 10:
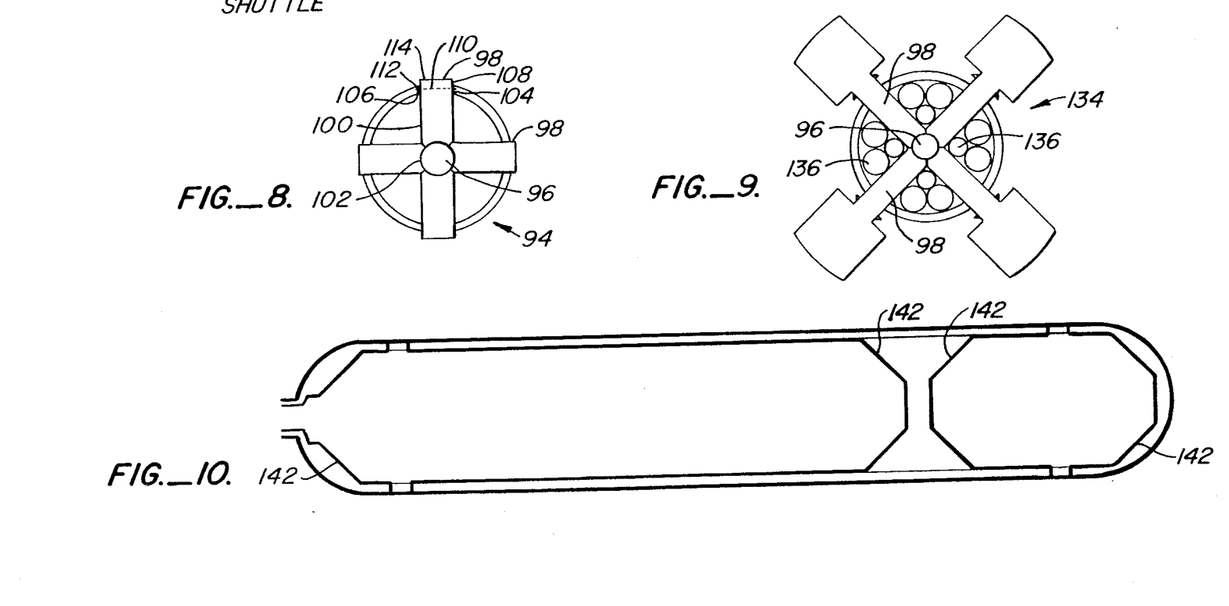
FIG. 8 is a cross-sectional view along line 8—8 shown in FIG. 7.
FIG. 9 is a cross-sectional view along line 9—9 shown in FIG. 7.
FIG. 10 is a partial cross-sectional view similar to FIG. 7 of a modified embodiment of a space vehicle fuel cell in accordance with the invention incorporated into the spacecraft configuration shown in FIGS. 1 and 2 and alternatively adapted for being independently launched into orbit.

As shown in FIG. 7, the external tank 12" preferably includes integrated intervessel structural and docking means 92, instead of the intervessel structural means 24' and the docking means 56 of the external tank 12' shown in FIG. 5. The integrated intervessel structural and docking means 92 preferably includes at least one bulkhead 94 between the inner wall 26" and the outer wall 36". As shown in FIG. 7, the integrated intervessel structural and docking means 92 preferably includes a bulkhead 94 located at the forward end 28" of the external tank 12" in the vicinity of the payload compartment 84', as well as a bulkhead positioned at the aft end 32" of the external tank. As shown in FIGS. 7 and 8, the bulkhead 94 preferably comprises an axial tunnel 96 which extends in a direction parallel to the longitudinal axis of the external tank 12". The axial tunnel 96 of the integrated intervessel structural and docking means 92 at the aft end 32" of the external tank 12" allows the flow of liquid hydrogen from the forward end 28" to the aft end 32" of the first pressure vessel means 20", as well as provides a portal for passage from the forward end 28" to the aft end 32" of the first pressure vessel means after deployment of the external tank 12" as a modular space station structural building component.

Furthermore, the bulkhead 94 preferably further comprises at least one and preferably four radial tunnels 98 which intersect the axial tunnel 96. Each radial tunnel 98 is preferably formed by a first cylindrical section 100 welded at a first end 102 to the axial tunnel 96 and a second end 104 having a flange 106 in the interstitial region between the inner wall 26" and the outer wall 36" of the external tank 12". Each radial tunnel 98 further comprises a second cylindrical section 108 having a first end 110 having a flange 112 in the interstitial region between the inner wall 26" and the outer wall 36" of the external tank 12" adapted to be bolted to the flange 106 at the second end 104 of the first cylindrical section 100. The second cylindrical section 108 also has a second end 114 adapted for a variety of purposes, as will be described shortly.

The flange 106 at the second end 104 of the first cylindrical section 100 is adapted to be bolted to the flange 112 at the first end 110 of the second cylindrical section 108 for the purpose of facilitating construction of the external tank 12". Specifically, the first cylindrical section 100 of each radial tunnel 98 can be interconnected with the axial tunnel 96 and integrated into the inner wall 26" of the external tank 12" during fabrication of the first pressure vessel means 20". Similarly, the second cylindrical section 108 of each radial tunnel 98 can be integrated into the outer wall 36" of the external tank 12" during fabrication of the second pressure vessel means 22". Subsequently, the flange 106 at the second end 104 of the first cylindrical section 100 can be bolted to the flange 112 at the first end 110 of the second cylindrical section 108 for securely interconnecting the first pressure vessel means 20" and the payload compartment 84' within the second pressure vessel means 22".

The extension of the radial tunnels 98 through the interstitial region between the inner wall 26" and the outer wall 36" counteracts spiraling of the flow of liquid oxygen as the liquid oxygen is being consumed, thereby avoiding a coriolis effect at the aft end 32" of the external tank 12". Flow vanes (not shown) can also be secured to the inner wall 26" or the outer wall 36", or both, in the interstitial region between the inner wall and the outer wall for producing axial flow of liquid oxygen in order to avoid the coriolis effect.

The integrated intervessel structural and docking means 92 also preferably includes a crown 46" in the form of a forward access port 116, instead of an arcuate plate. The forward access port 116 prevents forward movement of the first pressure vessel means 20" and the payload compartment 84' within the second pressure vessel means 22" due to the buoyancy of the first pressure vessel means and payload compartment.

The forward access port 116 comprises a first cylindrical section 118 having a first end 120 welded to the forward end of the payload compartment 84' and a second end 122 having a flange 124. The forward access port 116 further comprises a second cylindrical section 126 having a first end 128 having a flange 130 in the interstitial region between the dome 38" of the second pressure vessel means 22" and the dome 86' of the payload compartment 84'. The second cylindrical section 126 also has a second end 132 which is adapted for a variety of purposes, as will be described shortly.

The integrated intervessel structural and docking means 92 also preferably includes an intertank bulkhead 134 interposed between the dome 30" of the first pressure vessel means 20" and the dome 88' of the payload compartment 84', as shown in FIG. 7, instead of the intertank frame 90 interposed between the dome 30' of the first pressure vessel means 20' and the dome 88 of the payload compartment 84 of the external tank 12' shown in FIG. 5. The intertank bulkhead 134 strengthens the external tank 12" along the length of the external tank. The configuration of the intertank bulkhead 134 is similar to the configuration of the bulkhead 94, except for differences which will be described shortly.

As shown in FIG. 9, the intertank bulkhead 134 comprises an axial tunnel 96 and radial tunnels 98 similar to the axial tunnel 96 and radial tunnels 98, respectively, of the bulkhead 94. However, the radial tunnels 98 of the intertank bulkhead 134 are preferably angularly displaced 45° from axial alignment with the radial tunnels 98 of the bulkheads 94 for the purpose of counteracting spiraling of the flow of liquid oxygen as liquid oxygen is being consumed, thereby avoiding a coriolis effect at the aft end 32" of the external tank 12". Furthermore, storage tanks 136 can be stowed in the region between the radial tunnels 98, domes 30" and 88', and the inner wall 26". The storage tanks 136 can be utilized for storing gases to establish a habitable environment within the external tank 12", water, fuel, etc. The liquid oxygen within the interstitial region between the inner wall 26" and the outer wall 36" aids stabilization of the first pressure vessel means 20" and the payload compartment 84' within the second pressure vessel means 22", which reduces the structural requirements for the bulkheads 94, forward access port 116, and intertank bulkhead 134.

Furthermore, the integrated intervessel structural and docking means 92 preferably includes an aft access port 138 located at the aft end 32" of the external tank 12" The configuration of the aft access port 138 is similar to the configuration of the forward access port 116. The aft access port 138 prevents rearward axial displacement of the first pressure vessel means 20" and the payload compartment 84' within the second pressure vessel means 22".

Referring to FIGS. 1, 2, and 7, the bulkhead 94 at the aft end 32" of the external tank 12" provides a rigid structure for connection of the thrust attaches 50 for the two solid rocket boosters 16 and 18, as well as the thrust attaches 52 for the orbiter 14, to the external tank 12". Consequently, the aft end 32" of the external tank 12" can receive the thrust of the two solid rocket boosters 16 and 18, as well as the thrust of main engines 54 of the orbiter 14.

The conversion of the external tank 12" from a fuel cell to a modular space station structural building component is provided by access through the radial tunnels 98 of the bulkhead 94 and/or intertank bulkhead 134, as well as through the forward access port 116 and/or aft access port 138. Connections through the axial tunnel 96 in the bulkhead 94 and the intertank bulkhead 134 allow access to the interior of the first pressure vessel means 20" and payload compartment 84'.

Preferably, a docking module can be mounted to the second end 114 of the second cylindrical section 108 of each radial tunnel 98 of each bulkhead 94 and the intertank bulkhead 134, as well as the second end 132 of the second cylindrical section 126 of the forward access port 116 and the aft access port 138, of the integrated intervessel structural and docking means 92 for interconnection of the external tank 12" with other similar external tanks after orbital deployment and/or for connection to a supply module(s). The docking module DM-2 used in connection with the Apollo-Soyuz Test Program (ASTP) described above, for example, can be used as a docking module for interconnection of the external tank 12" with other similar external tanks. Whereas the external tank 12' shown in FIG. 5 is adapted for interconnection of the external tank in tandem with other similar external tanks, the external tank 12" shown in FIG. 7 is adapted not only for interconnection of the external tank in tandem with other external tanks but also for interconnection in side-by-side relationship by interconnection of radial tunnels 98 of the bulkhead 94 and/or intertank bulkhead 134 of the external tank to other similar external tanks. Interconnection of external tanks 12" in side-by-side relationship by interconnection of the radial tunnels 98 of the bulkhead(s) 94, for example, permits connection of a supply module(s) to the radial tunnels 98 of the intertank bulkhead 134, since the radial tunnels 98 of the intertank bulkhead 134 are preferably angularly displaced 45° from axial alignment with the radial tunnels 98 of the bulkheads 94.

Incorporation into the space shuttle 10 shown in FIGS. 1 and 2 enables the two solid rocket boosters 16 and 18 to be attached to the external tank 12, 12', or 12" so that the thrust from the rocket boosters is transmitted to the external tank from the two aft thrust attaches 50. Forward attaches 72 of the two solid rocket boosters 16 and 18 are hinged to the external tank 12, 12', or 12" so as to provide lateral rigidity only and do not transmit the thrust of the solid rocket motors. Similarly, the aft thrust attaches 52 of the orbiter 14 to the external tank 12, 12', or 12" transmit the thrust of the main engines 54 of the orbiter to the external tank. Forward attaches 74 of the orbiter 14 to the external tank 12, 12', or 12" are hinged for lateral rigidity only so as not to receive the thrust from the main engines 54 of the orbiter.

The space shuttle 10 during launch has the large cylindrical external tank 12, 12', or 12" located centrally, the two solid rocket boosters 16 and 18 positioned on diametrically opposed sides of the external tank, and the orbiter 14 positioned parallel to the external tank between the rocket boosters. As indicated in FIGS. 3, 5, and 7, hydrogen from the first pressure vessel means 20, 20', or 20" is supplied by a pipeline 76 which terminates with a flange 78 within the area of the aft orbiter thrust attaches 52 for connection with the orbiter hydrogen feed line for the main engines 54. Similarly, a pipeline 80 for the second pressure vessel means 22, 22', or 22" has a flange 82 adjacent to the aft orbiter thrust attaches 52 for connection with the orbiter oxygen feed line for the main engines 54.

The intervessel structural means 24 or 24' or the integrated intervessel structural and docking means 92 provides sufficient structural integrity for routing the thrust loads from the main engines 54 of the orbiter 14 and the two solid rocket boosters 16 and 18 to the external tank 12, 12', or 12", respectively. The intervessel structural means 24 and 24' and the integrated intervessel structural and docking means 92 are relatively lightweight compared with the intertank structure included in the external tank of the known space shuttle.

During ascent of the space shuttle 10, the attaches 50 and 72 of the two solid rocket boosters 16 and 18 are explosively severed following the depletion of the solid propellant, and eight small solid rocket motors (not shown) move the rocket boosters away from the external tank 12, 12', or 12". A parachute is deployed from each of the two solid rocket boosters 16 and 18 so as to allow later recovery. Thereafter, once orbit is achieved, the attaches 52 and 74 of the orbiter 14 to the external tank 12, 12', or 12" are explosively severed after the external tank is allowed to go into orbit with the orbiter, thereby permitting the external tank to be deployed for use as a modular space station structural building component.

The external tank 12, 12', or 12" in accordance with the invention is configured to be carried by the orbiter 14 to a predetermined earth orbit. The external tank 12, 12', or 12" is then jettisoned into orbit for use as a modular space station structural building component once orbit is achieved. The interstitial region between the inner wall 26, 26', or 26" and the outer wall 36, 36', or 36" is evacuated upon exhaustion of the oxygen so as to provide a thermally insulative region around the inner wall of the external tank 12, 12', or 12", respectively, similar to a thermos bottle structure. The external tanks 12, 12', or 12" from various space missions can be recovered as demonstrated by the recovery of satellites in orbit by the known space shuttle. The external tank 12, 12', or 12" is joined by a number of other similar external tanks where they are connected to form a pressure tight space station or space platform provisioned to support a crew for an extended period of time and large enough to generate simulated gravity upon thrust activated rotation.

Additionally, at least one recoverable rocket engine 140 can be mounted to the external tank 12, 12', or 12" for various purposes. The recoverable rocket engine 140 preferably is configured substantially similar to one of the main engines 54 of the orbiter 14. For example, one recoverable rocket engine 140 can be mounted to the aft end 32, 32', or 32" of the external rocket engine can be mounted on the side of the external tank diametrically opposed to the space shuttle 10 for allowing increased payload. However, a larger external tank 12, 12', or 12" for accommodating more fuel would be needed. Alternatively, one recoverable rocket engine 140 can be mounted to the aft end 32, 32' or 32" of recoverable rocket engines can be mounted on diametrically opposed sides of the external tank between the two solid rocket boosters 16 and 18, for the purpose of adapting the external tank for unmanned deployment as a modular space station structural building component.

The external tanks 12 or 12' can be connected in tandem, and the external tanks 12" can be connected in tandem and/or side-by-side, for the purpose of providing a superstructure for a space station or space platform. Arcuately configured external tanks 12, 12', or 12" can be connected in tandem to form a space station in the form of a toroid which can be given a rotational velocity to provide an internal gravity and can be pressurized with air to form a habitable space structure.

The external tank 12, 12', or 12" can be fabricated from graphite and resin and coated by metal deposition. Alternatively, the external tank 12, 12', or 12" can be fabricated from metal, such as aluminum. In the case of metal fabrication, the domes 30, 30', and 30", 34, 34', and 34", 86 and 86', and 88 and 88' can include flat sections 142, as shown in FIG. 10, for the purpose of facilitating fabrication of the external tank. In any event, the external tank 12, 12', or 12" can be fabricated in sections which are connected together for the purpose of providing a facilitated modular construction.

Consequently, the combined space vehicle fuel cell and modular space station structural building component in accordance with the invention provides an improved fuel cell configuration for propellant containment during launch characterized by shorter length or an added payload compartment and structural requirements concentrated at the aft end for enabling any and all thrust transfer attaches to be connected to the aft end of the space vehicle, thereby minimizing the weight of the fuel cell and at the same time lowering the center of gravity for allowing the application of thrust to be more vertically oriented. The combined space vehicle fuel cell and modular space station structural building component in accordance with the invention also provides a usable module for association with other similar modules to form a space station or space platform characterized by pre-installation of equipment on the earth so that payload requirements for construction of the space station are drastically reduced. Based on current cost estimates, in the case of the known space shuttle, the effective payload cost would be reduced from $1600 to $2000 a pound to $300 to $500 a pound, if the combined space vehicle fuel cell and modular space station structural building component in accordance with the invention were substituted for the known external tank.

Although the invention has been described in connection with exemplary embodiments for incorporation into a space shuttle, the invention pertains to any liquid fuel space vehicle, such as the space shuttle, Apollo rocket, etc. The key features are that the space vehicle fuel cell in accordance with the invention provides an improved container for propellants and can be recycled for use as a modular space station structural building component rather than have the fuel cell break apart and burn upon reentry into the atmosphere of the earth.

Although the invention has been described and illustrated in detail, it is to be clearly understood that the same is by way of illustration and example only and is not to be taken by way of limitation. While a variety of embodiments has been disclosed, various modifications and variations not mentioned above will occur to those skilled in the art in view of the embodiments which are described above and can still be made without departing from the spirit and scope of the invention as claimed below.

What is claimed is:

1. In a space shuttle having an orbiter spacecraft with main rocket engines, an external tank for propellants to which the orbiter spacecraft is mounted on one side, and a pair of solid rocket boosters mounted on opposed sides of the external tank, the improvement comprising:
   the external tank having a first pressure vessel means for containing a first propellant and a second pressure vessel means for containing a second propellant;
   the first pressure vessel means being contained within the second pressure vessel means;
   a payload compartment disposed in tandem with the first pressure vessel means, the payload compartment being contained within the second pressure vessel means;
   the solid rocket boosters being connected to the external tank and adapted to apply thrust generated by the rocket boosters to an aft end of the external tank; and
   the orbiter spacecraft being connected to the external tank so as to apply thrust generated by the main rocket engines to the aft of the external tank.

2. The space shuttle of claim 1 wherein the first pressure vessel means is concentrically contained within the second pressure vessel means.

3. The space shuttle of claim 1 wherein the first pressure vessel means is concentrically contained within the second pressure vessel means and the payload compartment is coaxial with the first and second pressure vessel means.

4. The space shuttle of claim 1, further comprising intervessel structural means disposed in an interstitial region between the first pressure vessel means and the second pressure vessel means for stabilizing the first pressure vessel means within the second pressure vessel means.

5. The space shuttle of claim 4 wherein the intervessel structural means comprises at least one stiffening ring interposed between the first pressure vessel means and the second pressure vessel means in the interstitial region.

6. The space shuttle of claim 5 wherein there is a plurality of stiffening rings axially spaced along the length of the external tank in the interstitial region between the first pressure vessel means and the second pressure vessel means, the stiffening rings having cutouts for permitting flow of the second propellant from a forward end of the external tank to the aft end, the cutouts being oriented so as to prevent a coriolis effect at the aft end of the second pressure vessel means.

7. The space shuttle of claim 4 wherein the intervessel structural means comprises a crown interposed between the first pressure vessel means and the second pressure vessel means in the interstitial region.

8. The space shuttle of claim 4 wherein the intervessel structural means comprises a thrust frame disposed at the aft end of the external tank interposed between the first pressure vessel means and the second pressure vessel means in the interstitial region, and further comprising thrust attaches for the solid rocket boosters and the main rocket engines connected to the aft end of the external tank.

9. The space shuttle of claim 1, further comprising intervessel structural means including an intertank frame interposed between the first pressure vessel means and the payload compartment.

10. The space shuttle of claim 1, further comprising integrated intervessel structural and docking means interconnected between the first pressure vessel means and the second pressure vessel means for stabilizing the first pressure vessel means within the second pressure vessel means.

11. The space shuttle of claim 10 wherein the integrated intervessel structural and docking means comprises at least one bulkhead interconnected between the first pressure vessel means and the second pressure vessel means.

12. The space shuttle of claim 11 wherein there is a plurality of bulkheads axially spaced along the length of the external tank interconnected between the first pressure vessel means and the second pressure vessel means, the bulkheads having radial tunnels extending through an interstitial region between the first pressure vessel means and the second pressure vessel means, the second propellant flowing from a forward end of the external tank to the aft end through the interstitial region around the radial tunnels, the radial tunnels being oriented so as to prevent a coriolis effect at the aft end of the pressure vessel means.

13. The space shuttle of claim 11 wherein the at least one bulkhead comprises:
an axial tunnel aligned with a longitudinal axis of the external tank for permitting flow of the first propellant from a forward end of the external tank to the aft end; and
at least one radial tunnel extending through an interstitial region between the first pressure vessel means and the second pressure vessel means, the second propellant flowing from the forward end of the external tank to the aft end through the interstitial region around the at least one radial tunnel.

14. The space shuttle of claim 13 wherein the at least one radial tunnel comprises:
a first cylindrical section having a first end connected to the axial tunnel and having a second end having a flange; and
a second cylindrical section having a first end having a flange connectable to the flange at the second end of the first cylindrical section and having a second end adapted for mounting a docking module.

15. The space shuttle of claim 10 wherein the integrated intervessel structural and docking means comprises at least one access port interconnected between the first pressure vessel means and the second pressure vessel means, the at least one access port comprising:
a first cylindrical section having a first end and having a second end having a flange; and
a second cylindrical section having a first end having a flange connectable to the flange at the second end of the first cylindrical section and having a second end adapted for mounting a docking module.

16. The space shuttle of claim 11 wherein a bulkhead is located at the aft end of the external tank interconnected between the first pressure vessel means and the second pressure vessel means, and further comprising thrust attaches for the solid rocket boosters and the main rocket engines connected to the aft end of the external tank.

17. The space shuttle of claim 1, further comprising integrated intervessel structural and docking means including an intertank bulkhead interposed between the first pressure vessel means and the payload compartment.

18. The space shuttle of claim 17 wherein the intertank bulkhead comprises:
an axial tunnel aligned with a longitudinal axis of the external tank interconnected between the first pressure vessel means and the payload compartment;
at least one radial tunnel extending through the second pressure vessel means, the at least one radial tunnel comprising:
a first cylindrical section having a first end connected to the axial tunnel and having a second end having a flange; and
a second cylindrical section having a first end having a flange connectable to the flange at the second end of the first cylindrical section and having a second end adapted for mounting a docking module; and
a plurality of storage tanks disposed exterior to the axial tunnel and the at least one radial tunnel.

19. The space shuttle of claim 1 wherein the payload comprises decks installed in the first pressure vessel means.

20. The space shuttle of claim 1, further comprising a first pipeline in fluid circuit with the interior of the first pressure vessel means and a second pipeline in fluid circuit with the interior of the second pressure vessel means for feeding the first and second propellants from the first and second pressure vessel means, respectively, to the main rocket engines.

21. The space shuttle of claim 1 wherein the first pressure vessel means comprises an inner cylindrical wall capped at a forward end of the external tank by a first end dome and capped at the aft end by a second end dome and the second pressure vessel means comprises an outer cylindrical wall capped at the forward end by a third end dome and capped at the aft end by a fourth end dome, the outer cylindrical wall and third and fourth domes of the second pressure vessel means surrounding the first pressure vessel means so as to define an interstitial region between the first pressure vessel means and the second pressure vessel means.

22. The space shuttle of claim 21 wherein the payload comprises a payload compartment disposed in tandem with the first pressure vessel means, the payload compartment being contained within the second pressure vessel means, the payload compartment including a portion of the inner wall intermediate the first and third domes capped at the forward end by a fifth end dome and capped at the aft end by a sixth end dome.

23. The space shuttle of claim 1 wherein the first propellant is liquid hydrogen and the second propellant is liquid oxygen.

24. A modular space station structural building component, comprising:
 a fuel cell having a first pressure vessel means for containing one propellant, a payload compartment connected in tandem with the first pressure vessel means, and a second pressure vessel means for containing another propellant;
 the first pressure vessel means and payload compartment both being contained within the second pressure vessel means; and
 docking means for interconnecting the fuel cell to a preselected structure in orbit.

25. The modular space station structural building component of claim 24 wherein the first pressure vessel means is concentrically contained within the second pressure vessel means and the payload compartment is coaxial with the first pressure vessel means.

26. The modular space station structural building component of claim 24 wherein the payload comprises decks installed in the first pressure vessel means.

27. The modular space station structural building component of claim 24 wherein the first pressure vessel means comprises an inner cylindrical wall capped at a forward end of the fuel cell by a first end dome and capped at an aft end of the fuel cell by a second end dome and the second pressure vessel means comprises an outer cylindrical wall capped at the forward end by a third end dome and capped at the aft end by a fourth end dome, the outer cylindrical wall and third and fourth domes of the second pressure vessel means surrounding the first pressure vessel means so as to define an interstitional region between the first pressure vessel means and the second pressure vessel means.

28. The modular space station structural building component of claim 27 wherein the payload comprises a payload compartment disposed in tandem with the first pressure vessel means, the payload compartment being contained within the second pressure vessel means, the payload compartment including a portion of the inner wall intermediate the first and third domes capped at the forward end by a fifth end dome and capped at the aft end by a sixth end dome.

29. The modular space station structural building component of claim 24 wherein the preselected structure is an end of a similarly configured fuel cell in orbit.

30. The modular space station structure building component of claim 27 wherein passages are provided in the first, second, third, and fourth domes and the docking means is associated with the respective ends of the fuel cell for interconnection with the ends of similarly configured fuel cells in end-to-end relation.

31. The modular space station structural building component of claim 29, further comprising at least one bulkhead interconnected between the first pressure vessel means and the second pressure vessel means and extending through the second pressure vessel means, the bulkhead being connectable to the docking means for interconnecting the fuel cell to the preselected structure in side-by-side relation.

32. The modular space station structural building component of claim 24, further comprising an intertank bulkhead interposed between the first pressure vessel means and the payload compartment and extending through the second pressure vessel means, the intertank bulkhead being connectable to the docking means for interconnecting the fuel cell to the preselected structure in side-by-side relation.

33. The modular space station structural building component of claim 21 wherein the one propellant is liquid hydrogen and the other propellant is liquid oxygen.

34. A combined space vehicle fuel cell and modular space station structural building component, comprising:
 an external tank, comprising:
  a first pressure vessel means for containing one propellant during launch of a space vehicle; and
  a second pressure vessel means surrounding the first pressure vessel means so as to define an interstitial region between the interior of the second pressure vessel means and the exterior of the first pressure vessel means for containing a second propellant;
 a payload compartment disposed in tandem with the first pressure vessel means, the payload compartment being contained within the second pressure vessel means;
 the external tank being adapted for interconnection with similarly configured external tanks; and
 docketing means for interconnecting at least two external tanks.

35. The combined space vehicle fuel cell and modular space station structural building component of claim 34 wherein the docking means comprises a docking module.

36. The combined space vehicle fuel cell and modular space station structural building component of claim 34 wherein the first pressure vessel means is concentrically contained within the second pressure vessel means.

37. The combined space vehicle fuel cell and modular space station structural building component of claim 34 wherein the first pressure vessel means is concentrically contained within the second pressure vessel means and the payload compartment is coaxial with the first pressure vessel means.

38. The combined space vehicle fuel cell and modular space station structural building component of claim 34, further comprising intervessel structural means for stabilizing the first pressure vessel means within the second pressure vessel means.

39. The combined space vehicle fuel cell and modular space station structural building component of claim 34, further comprising intervessel structural means including an intertank frame interposed between the first pressure vessel means and the payload compartment.

40. The combined space vehicle fuel cell and modular space station structural building component of claim 34, further comprising integrated intervessel structural and docking means for stabilizing the first pressure vessel means within the second pressure vessel means.

41. The combined space vehicle fuel cell and modular space station structural building component of claim 34, further comprising integrated intervessel structural and docking means including an intertank bulkhead interposed between the first pressure vessel means and the payload compartment.

42. The combined space vehicle fuel cell and modular space station structural building component of claim 34 wherein the payload comprises decks installed in the first pressure vessel means.

43. The combined space vehicle fuel cell and modular space station structural building component of claim 34 wherein the one propellant is liquid hydrogen and the second propellant is liquid oxygen.

* * * * *